United States Patent [19]
Peng

[11] Patent Number: 5,717,561
[45] Date of Patent: Feb. 10, 1998

[54] SHARING ARRANGEMENT FOR SURGE PROTECTION CIRCUITRY

[75] Inventor: Ping Peng, Harrisburg, Pa.

[73] Assignee: The Whitaker Corporation, Wilmington, Del.

[21] Appl. No.: 636,299

[22] Filed: Apr. 23, 1996

Related U.S. Application Data

[63] Continuation-in-part of Ser. No. 515,182, Aug. 11, 1995, abandoned.

[51] Int. Cl.$^6$ .................................................. H02H 9/02
[52] U.S. Cl. .................................... 361/119; 361/111
[58] Field of Search ........................... 361/56, 58, 91, 361/103, 104, 111, 119, 106

[56] References Cited

U.S. PATENT DOCUMENTS

| | | | |
|---|---|---|---|
| 4,282,555 | 8/1981 | Svedberg | 361/56 |
| 4,389,695 | 6/1983 | Carpenter, Jr. | 361/56 |
| 4,449,156 | 5/1984 | Singer, Jr. | 361/119 |
| 4,477,857 | 10/1984 | Crocker | 361/119 |
| 4,661,878 | 4/1987 | Brown et al. | 361/56 |
| 4,905,119 | 2/1990 | Webb | 361/119 |
| 5,274,524 | 12/1993 | Pezzani et al. | 361/56 |
| 5,341,269 | 8/1994 | Hayward et al. | 361/119 |
| 5,357,568 | 10/1994 | Pelegris | 361/119 |
| 5,359,657 | 10/1994 | Pelegris | 379/412 |
| 5,367,569 | 11/1994 | Roach et al. | 379/412 |

FOREIGN PATENT DOCUMENTS 0 185 777  7/1986  European Pat. Off. .......... H02H 9/04

OTHER PUBLICATIONS

*Elektronik;* "Bodyguards fur SLICs Neues Prinzip bei der Uberspannungsableitung"; vol. 40, No. 20; 1 Oct. 1991.
PCT International Search Report; International Application No. PCT/US96/13089. International Filing Date Dec. 8, 1996.

*Primary Examiner*—Ronald W. Leja

[57] ABSTRACT

Transient voltage surge protection circuitry for a plurality of transmission line-pairs (10–18) utilizes a single multi-terminal protective network (34) coupled to individual lines (52–56) of the transmission line-pairs by full-wave diode bridge circuits (48) and resettable fuse elements (62,64).

8 Claims, 1 Drawing Sheet

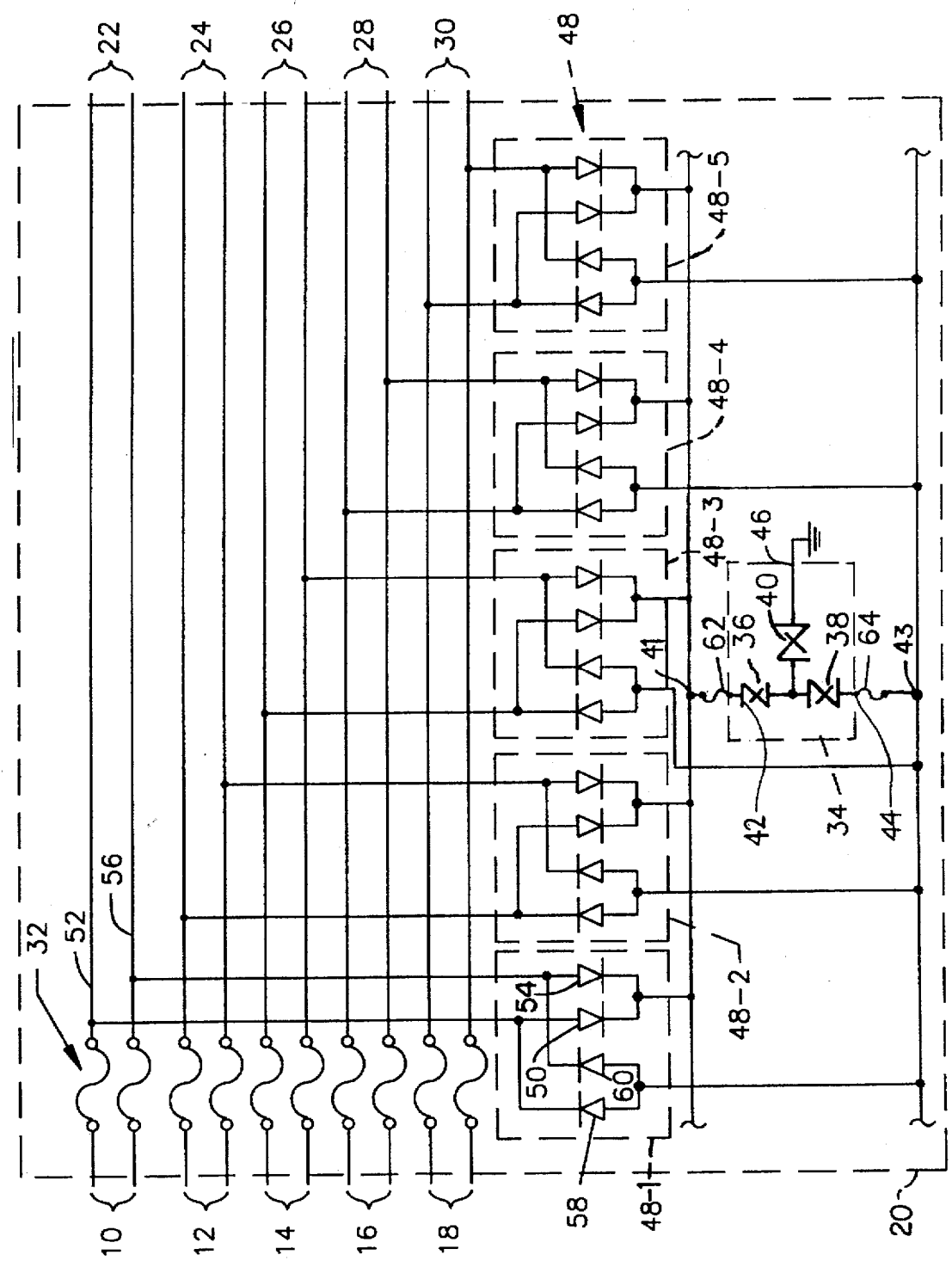

SHARING ARRANGEMENT FOR SURGE PROTECTION CIRCUITRY

CROSS-REFERENCE TO RELATED APPLICATIONS

This application is a continuation-in-part of patent application Ser. No. 08/515,182 filed Aug. 11, 1995, now abandoned, and which is related to U.S. patent application Ser. No. 08/515,181 filed on even date herewith and assigned to the assignee of the present invention, now U.S. Pat. No. 5,563,761.

BACKGROUND OF THE INVENTION

This invention relates to transient voltage surge protection circuitry for a plurality of transmission line-pairs carried by a multi-conductor cable and, more particularly, to an arrangement for sharing a single protective network among the plurality of line-pairs.

Telecommunications transmission lines are typically susceptible to lightning strikes when not within a building. Accordingly, primary lightning protection is usually provided where the transmission lines enter a building. However, modern telecommunications equipment, such as computer controlled private branch exchanges, are very sensitive to transient surges such as those caused by lightning strikes and the primary lightning protection is often inadequate. Telecommunications equipment manufacturers therefore commonly provide secondary surge protection within their equipment. Such equipment, for example, a computer controlled private branch exchange, may have twenty, fifty or even more, telephone line-pairs connected thereto. Therefore, if the secondary surge protection is incorporated within the equipment, this leads to a number of disadvantages. One disadvantage is that the secondary surge protection takes up valuable "real estate" within the telecommunications equipment. Another disadvantage is that bulky cables carrying thick wire have to be utilized between the primary protection and the secondary protection. Co-pending U.S. patent application Ser. No. 08/515,181 proposes to overcome the aforementioned disadvantages by providing the secondary protection within an assembly connected between two multi-conductor cables. As disclosed therein, the protection circuitry comprises a respective protective network for each of the transmission line-pairs. A multiconductor cable, therefore, requires as many protective network chips as there are conductors. A large number of the protective network chips add bulk and cost to the secondary protection adapter to be interposed between two connectors in a telecommunication multiple line-pair system. The cost of the duplicated part becomes a significant portion of the overall manufacturing cost of the secondary protection. It would be desirable for each line-pair to share a single protective network. A sharing arrangement would reduce the size and cost of the secondary protection adapter.

It is an object of the present invention to provide a circuit design which provides cost savings advantages over the prior design which uses a respective protective network for each of the line-pairs by permitting a single protective network to be shared among a plurality of line-pairs.

SUMMARY OF THE INVENTION

The foregoing and additional objects are attained in accordance with the principles of this invention by providing a circuit arrangement which utilizes a single multi-terminal protective network to provide transient voltage surge protection for a plurality of transmission line-pairs.

A circuit arrangment comprises a telecommunications line pair connected to first and second terminals of a protective network. A first line in a plurality of the line pairs is connected to a first common terminal through a means for isolating the respective lines. The first common terminal is connected to the first terminal of the protective network through a resettable fuse element.

It is an advantage of the present invention that a plurality of transmission lines can share a single protective network.

BRIEF DESCRIPTION OF THE DRAWINGS

The foregoing will be more readily apparent upon reading the following description in conjunction with the drawing in which the single FIGURE thereof illustrates a circuit arrangement constructed according to this invention.

DETAILED DESCRIPTION

Referring now to the drawing, a plurality of transmission line-pairs 10, 12, 14, 16 and 18 connected to primary lightning protection (not shown) are coupled through secondary transient voltage surge protection adaptor 20 to respective ones of the plurality of transmission line-pairs 22, 24, 26, 28 and 30 which extend to telecommunications equipment (not shown). The transmission line-pairs 10–18 are preferably contained as part of a first multi-conductor cable (not shown), and the transmission line-pairs 22–30 are preferably contained as part of a second multi-conductor cable (not shown). These multi-conductor cables are preferably coupled to the adaptor 20 by respective cable connectors (not shown). Although five sets of transmission line-pairs are illustrated, it is understood that more or fewer sets of line-pairs can be connected to the adaptor 20, which can be expanded or contracted as desired.

The adaptor 20 includes a plurality of resettable fuse elements 32 each interposed serially in a respective line connecting the line-pairs 10–18 with the respective line pairs 22–30. Illustratively, the fuse elements 32 are of the type TR-600-150 sold by Raychem Corp. Such fuse elements open the electrical circuit therethrough when heated due to a threshold current. The fuse elements reset to short the electrical circuit when they cool down in the presence of a current below the threshold current.

The adaptor 20 includes a single multi-terminal protective network 34 for providing transient voltage surge protection for all of the transmission line-pairs 10–18 and 22–30. The protective network 34 includes three SIDACtor elements 36, 38 and 40 connected in a "Y" configuration between a first terminal 42 of the network 34, a second terminal 44 of the network 34 and a third terminal 46 of the network 34. The terminal 46 is connected to ground. The network 34 is illustratively of the type manufactured by Teccor Electronics, Inc. of Irving, Tex. and is fully described in U.S. Pat. No. 4,905,119. Thus, the protective network 34 includes a first bi-directional voltage sensitive switch 36 having first and second leads, a second bi-directional voltage sensitive switch 38 having third and fourth leads, a third bi-directional voltage sensitive switch 40 having fifth and sixth leads, means for connecting the first lead of the switch 36 to the terminal 42, means for connecting together the second lead of the first switch 36, the third lead of the second switch 38 and the fifth lead of the third switch 40, means for connecting the fourth lead of the second switch 38 to the terminal 44 and means for connecting the sixth lead of the third switch 40 to the terminal 46.

For coupling the line-pairs 10–18 and 22–30 to the protective network 34, there is provided a plurality of unidirectional current paths from each line 52,56 of each of the line-pairs 10–18 to a first common terminal 41 and a plurality of unidirectional current paths from a second common terminal 43 to each line 52,56 of each of the line-pairs. Illustratively, these unidirectional current paths are provided by a plurality of full-wave diode bridge circuits 48, one for each set of line-pairs 10–18. Thus, for the set of line-pairs 10, 22, the diode bridge circuit 48-1 includes a diode 50 for providing a unidirectional current path from the line 52 to the first common terminal 41; a diode 54 for providing a unidirectional current path from the line 56 to the first common terminal 41; a diode 58 for providing a unidirectional current path from the second common terminal 43 to the line 52; and a diode 60 for providing a unidirectional current path from the second common terminal 43 to the line 56.

A first resettable fuse element 62 is connected between the first terminal 42 of the protective network 34 and the first common terminal 41. A second resettable fuse element 64 is connected between the second terminal 44 of the protective network 34 and the second common terminal 43. In a preferred embodiment the fuse element 62,64 are of the same type as the fuse elements 32. The fuse elements 62,64 perform the following function; in response to a voltage surge due to, for example, a lighting strike, the SIDACtors 40 and 36 or 38 are turned on, shorting the voltage surge to ground potential. When the voltage surge passes and the line pairs 10–18, 22–30 return to their normal operating conditions, the leakage currents from all of the line pairs 10–18 and through the diodes 50,54,58,60 when summed at the first or second common terminal 41,43 will, in the absence of resettable fuse elements 62,64, not permit the SIDACtors 40 and 36 or 38 to turn off to open the circuit between the line pairs 10–18 and ground 46. The additive current from all line pairs 10–18 is above the current turn off threshold of the SIDACtors in the protective network 34. The fuse element 62,64 provide a current responsive element to provide an open circuit in response to the additive current from the line pairs 10–18. When the voltage surge has passed, therefore, the additive current which is a sum of the leakage currents of the line pairs 10–18 in their normal operating condition will cause the resettable fuse element 62 or 64 to open. Opening of the circuit that provides a current flow through the SIDACtor elements permits the SIDACtor elements to reset to their normally off condition that provides an open circuit to ground potential in the absence of a threshold voltage. After the SIDACtor elements 38,38,40 of the protective network 34 have provided a halt to the current flow through resettable fuse element 62 or 64, the resettable fuse elements 62 or 64 cool down in the absence of the current flow and turn back to their normal state of a short circuit. The resettable fuse element and SIDACtor circuit therefore returns to its normal operating state which is a short circuit connection between the first common terminal 41 and first terminal 42 as well as a short circuit connection between second common terminal 43 and second terminal 44. The short circuit connection through resettable fuses 62 and 64 provide for a sufficiently direct connection between line pairs 10–18 and protective network 34 so that protective network 34 is sufficiently responsive to voltage surges on line pairs 10–18. The resettable voltage responsive protective network 34 in combination with resettable fuse elements 62,64 therefore provide for a resettable and voltage responsive protective circuit that may be shared among a plurality of line pairs.

Line pairs 10–18 are connected to first and second common terminals through a full wave diode bridge circuit 48. The diode bridge circuit provides a bi-directional current path to the protective network 34 through first and second common terminals 41,43 as well as voltage isolation between lines 52,56 of respective line-pairs 10–18. Further, the full-wave diode bridge circuits 48 connected in series between the respective transmission line-pairs and the protective network 34 results in a lowering of the overall capacitance of each of the line-pairs. This improves the circuit high frequency performance.

If a positive transient voltage surge appears on the line 52, the current accompanying such surge passes to the protective network 34 through the diode 50. If a positive transient voltage surge appears on the line 56, the current accompanying such surge passes to the protective network 34 through the diode 54. If a negative transient voltage surge appears on the line 52, the current accompanying such surge is carried by the diode 58. If a negative transient voltage surge appears on the line 56, the current accompanying such surge is carried by the diode 60. Accordingly, by providing the resettable fuses 62 and the diode bridge circuits 48, a single protective network 34 can be utilized for all of the transmission line-pairs in place of one protective network 34 for each of the line-pairs. Although the diode bridge circuits 48 are provided (one for each set of line-pairs), due to the relative costs of the components, it has been found that the circuitry shown in the drawing and described above results in significant size and cost saving for an adaptor 20 which handles twenty-five transmission line-pairs over the cost of an adaptor with a protective network for each of the line-pairs.

Accordingly, there has been disclosed improved circuitry for providing transient voltage surge protection for a plurality of transmission line-pairs. While an illustrative embodiment of the present invention has been disclosed herein, it is understood that various modifications and adaptations to the disclosed embodiment will be apparent to those of ordinary skill in the art and it is intended that this invention be limited only by the scope of the appended claims.

What is claimed is:

1. A circuit arrangement comprising;

a plurality of telecommunications line-pairs connected to first and second terminals of a protective network, first lines of said plurality of line-pairs connected to a first common terminal through a means for isolating respective first lines, said first common terminal connected to the first terminal of the protective network through a first fuse element.

2. A circuit arrangement as recited in claim 1 and further comprising second lines of said plurality of line-pairs connected to a second common terminal through a means for isolating respective second lines, said second common terminal connected to the second terminal of the protective network through a second fuse element.

3. A circuit arrangement as recited in claim 2 wherein said means for isolating respective first and second lines comprises a bi-directional current device.

4. A circuit arrangement as recited in claim 2 wherein said means for isolating said first and second lines comprises a diode bridge circuit.

5. A circuit arrangement as recited in claim 2 further comprising resettable fuse elements in the first and second lines of the line pairs.

6. A circuit arrangement as recited in claim 2, wherein said second fuse element is resettable.

7. A circuit arrangement as recited in claim 1 wherein said means for isolating respective first lines comprises a unidirectional current device.

8. A circuit arrangement as recited in claim 1, wherein said first fuse element is resettable.

* * * * *